(12) United States Patent
Miyazaki et al.

(10) Patent No.: US 6,983,665 B2
(45) Date of Patent: Jan. 10, 2006

(54) FIXING STRUCTURE FOR SENSING ELEMENT

(75) Inventors: Haruyuki Miyazaki, Shizuoka (JP); Toshio Homma, Tokyo (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/983,976

(22) Filed: Oct. 26, 2001

(65) Prior Publication Data

US 2002/0059835 A1 May 23, 2002

(30) Foreign Application Priority Data

Oct. 27, 2000 (JP) .............................. 2000-329512

(51) Int. Cl.
G01L 1/22 (2006.01)

(52) U.S. Cl. ................................. 73/862.474
(58) Field of Classification Search ........... 73/862.045, 73/862.044, 862.474, 781, 782, 850; 177/211
See application file for complete search history.

(56) References Cited

U.S. PATENT DOCUMENTS 3,272,003 A * 9/1966 Harting ...................... 73/775
3,780,817 A * 12/1973 Videon ...................... 177/136
3,782,182 A * 1/1974 Starr ........................... 73/782
5,539,158 A * 7/1996 Utsunomiya et al. ....... 177/211

FOREIGN PATENT DOCUMENTS

| DE | 295 18 215 U1 | 6/1996 |
| EP | 0 191 305 A2 | 1/1986 |
| EP | 0 908 708 A1 | 4/1999 |
| EP | 908708 A1 * | 4/1999 |
| JP | 8-313332 | 11/1996 |
| JP | 2001-296177 | 10/2001 |

OTHER PUBLICATIONS

Japanese Abstract No. 2000019004, dated Jan. 21, 2000.

* cited by examiner

Primary Examiner—Max Noori
(74) Attorney, Agent, or Firm—Sughrue Mion, PLLC

(57) ABSTRACT

A fixing structure for a sensing element, wherein a load sensor is located at the central part of a plate member as a support member of a sensing element in the longitudinal direction. The plate member is attached to a load measuring location so that a length of the plate member when viewed in the longitudinal direction expands and contracts in accordance with a tension force or a compression force applied to the load measuring location, and both ends of the plate member when viewed in the longitudinal direction are welded to the load measuring location.

4 Claims, 5 Drawing Sheets

FIXING STRUCTURE FOR SENSING ELEMENT

The present invention is based on Japanese Patent Application No. 2000-329512, the entire contents of which are incorporated herein by reference.

BACKGROUND OF THE INVENTION

1. Field of the Invention

The present invention relates to a fixing structure for a strain gauge type sensing element, which is available for measuring a loading weight of a vehicle, e.g., truck.

2. Description of the Related Art

Recently, a vehicle loaded with heavy luggage, e.g., truck, suffers from troubles. For example, it causes traffic accident, e.g., its turning over on its side during its running, and quickens the deterioration of the vehicle per se or the road. One of the causes of such troubles is overloading. A measure having been taken to prevent this overloading is to measure a loading weight of the vehicle, i.e., a load acting on the vehicle.

By convention, the vehicle load is measured in a state that the vehicle to be measured is placed on a platform balance. Accordingly, the measuring equipment is large and a large space is required for its installation. For this reason, the number of platform balances that maybe installed is limited, and their installation cost is high.

Recently, a load measuring apparatus is used which measures a vehicle load in a state that the apparatus is mounted on the vehicle per se.

A shackle is interposed between a first end of a leaf spring which is coupled at a second end to a load carrying platform through a bifurcated bracket and another bracket coupled to the load carrying platform. In a load measuring apparatus disclosed in JP-A-8-313332, based on this structure, a strain gauge type sensing element for measuring a vehicle load, such as a strain gauge sensor, is attached to within a shackle bin, which is used for coupling the shackle to the bracket in a swingable manner. A load is computed based on a total of measured values derived from a plurality of sensing elements corresponding to the wheels.

Each load sensor is located at the central part of a plate member covered with an insulating film. The load sensor includes a resistor portion in which four resistors, which intersect the plate member at an angle of 45° in both the longitudinal and width directions, are connected in a substantially rectangular form, and four terminals located at the connecting points of the resistors.

When one of the bracket and the shackle is moved to the other by a load acting on the vehicle, a shear force acts on the plate member in the width direction, so that resistance values of the resistors vary and a magnitude of the load is detected.

In the load measuring apparatus of JP-A-8-313332, the sensing elements are inserted into the containing parts of the shackle and fixed there. Accordingly, the sensing element sometimes is loosened and slightly moves. This makes the measurement accuracy poor.

Further, in the convention load measuring apparatus, it is necessary to bore the shackle to insert the sensing element into the bored location, and to lead a lead wire out of the shackle bin. Accordingly, the assembling work to the sensing elements to the load measuring locations is troublesome, and the shackle bin used for the load measuring location is weakened in strength.

Accordingly, an object of the present invention is to provide a means to solve the defects of the conventional load measuring apparatus.

To achieve the above object, there is provided a fixing structure for a sensing element, where in a load sensor is located at the central part of a plate member as a support member of a sensing element in the longitudinal direction, the plate member is attached to a load measuring location so that a length of the plate member when viewed in the longitudinal direction expands and contracts in accordance with a tension force or a compression force applied to the load measuring location, and both ends of the plate member when viewed in the longitudinal direction are welded to the load measuring location.

In the fixing structure, the plate member is welded to the load measuring location. Accordingly, the sensing element may easily be attached to the load measuring location. Accordingly, the fixing structure prevents the plate member from being loosened and slightly movable, and hence ensures an accurate measurement of the load. If the measurement is repeated, the measurement accuracy is not degraded. The sensing element is welded at only two positions. When comparing with the fastening at three points or larger, generation of a welding stress in a torsional direction in the sensing element maybe prevented, and hence a stable strain detection is secured. Since the welding is made at the locations spaced furthest from the load sensor, the load sensor is less affected by heat conduction.

In the fixing structure for a sensing element, the plate member is so thin as not to be buckled by a compression force applied to the load measuring location.

Since the plate member is thin, appropriate welding to the load measuring location is secured. Since the plate member is thin to such an extent as to avoid deflection by the buckling, an accurate load sensing is ensured.

In the fixing structure for a sensing element, the load sensor is arranged such that four resistors made of conductive material are bridge connected on an insulating area formed on the reverse side of the plate member, the resistors are connected at four connection points, and voltage is applied to the two connection points located on a diagonal line, and a potential difference appears between the two connection points located on the diagonal line and varies in accordance with a compression force or a tension force acting on the plate member, and the two resistors of the four resistors are oppositely disposed on the insulating area in the longitudinal direction of the plate member, while the remaining paired resistors are oppositely disposed on the insulating area in the widthwise direction.

In the fixing structure thus arranged, a compression force or a tension force applied to the plate member through the welding parts acts to the resistors to vary resistance values of them. A load acting on the load measuring location may be correctly detected.

DETAILED DESCRIPTION OF THE PREFERRED EMBODIMENTS

The preferred embodiments of the present invention will be described with reference to accompanying drawings.

Figure 1:
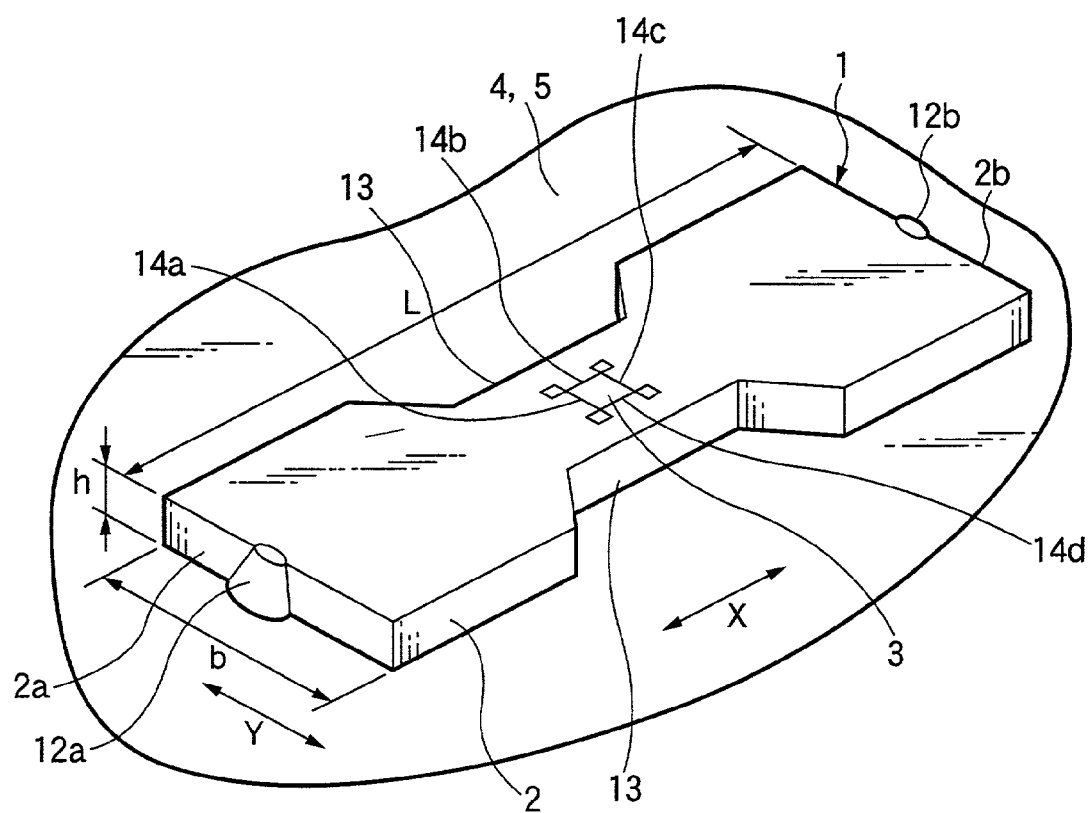
FIG. 1 is a perspective view showing a fixing structure of a sensing element according to the invention.
Figure 2:
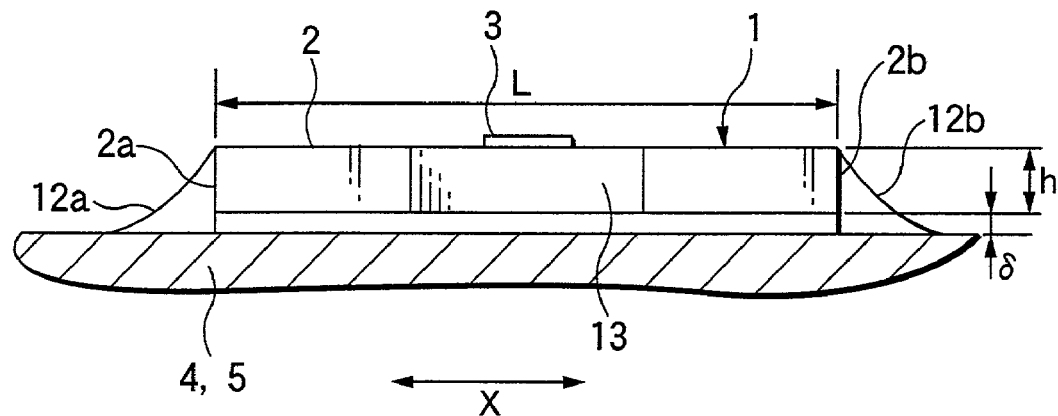
FIG. 2 is a side view showing the fixing structure of FIG. 1.

As shown in FIGS. 1 and 2, a sensing element 1 for measuring a load on a vehicle, such as a loading weight, includes a substantially rectangular plate member 2 as a support member, and a load sensor 3 formed at the central part of the plate member 2 in the longitudinal direction X.

Figure 3:
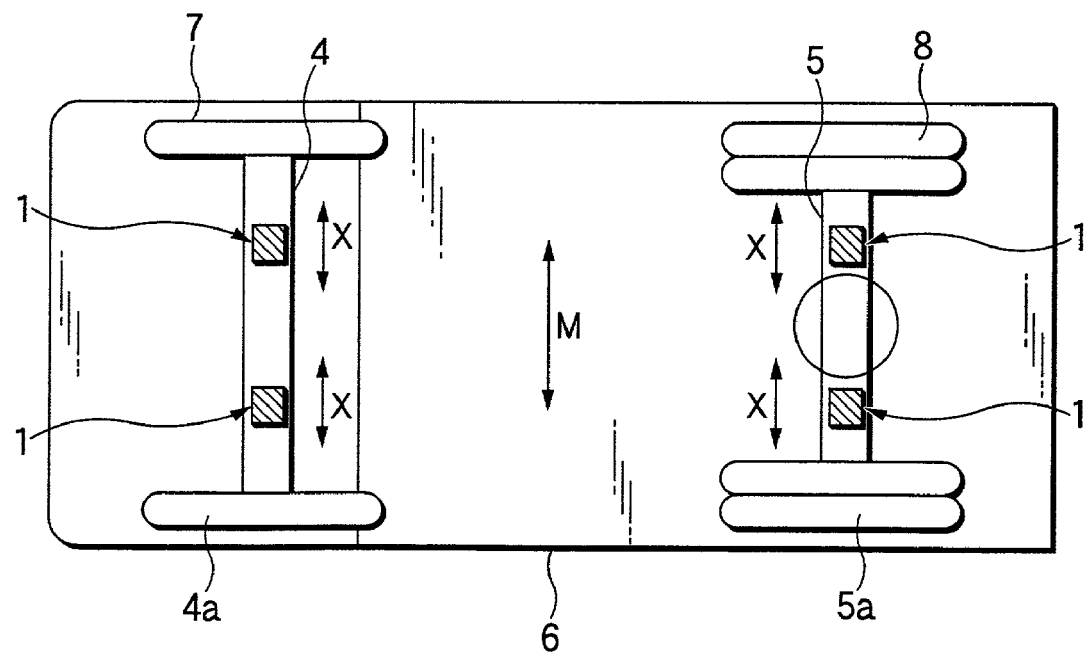
FIG. 3 is a view showing a layout of the sensing elements mounting on a vehicle in a model form.

As shown in FIG. 3, sensing elements 1 are attached to the right and left parts on each of the front and rear axles 4 and 5 so that a length of the plate member 2 in the longitudinal direction X is expanded and contracted in a direction of a tension force or a compression force, which acts on a load measuring location, namely, the length of it is expanded and contracted in parallel to the width direction M of the vehicle 6. In FIG. 3, reference numeral 7 designates front wheels 7 and numeral 8 represents rear wheels. The plate members 2 are attached to the upper surfaces of the axles 4 and 5, respectively. As shown in FIGS. 1 and 2, both ends 2a and 2b of each plate member 2 are welded to each of the axles 4 and 5 as load measuring locations.

Figure 4:
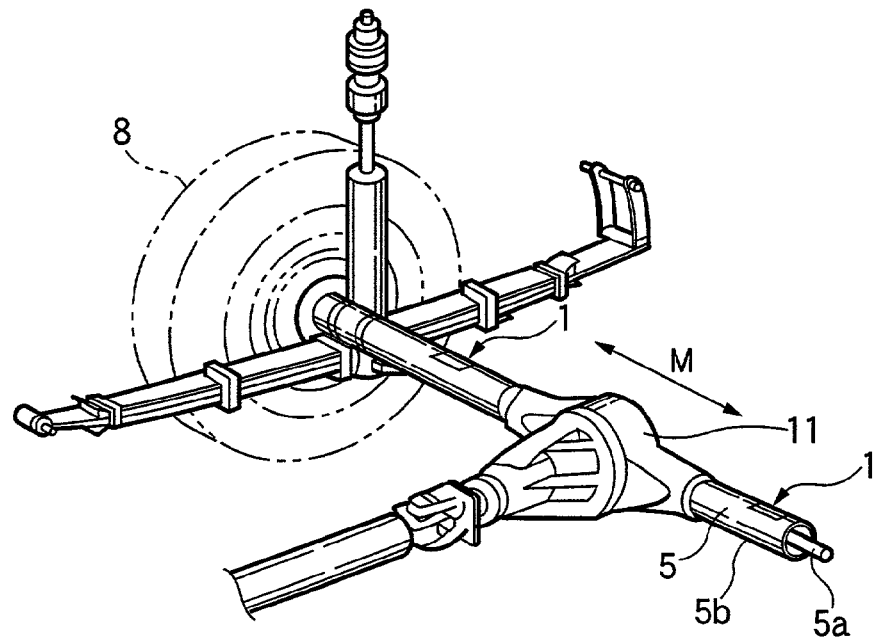
FIG. 4 is a perspective view showing a sensing element mounted on the rear axle of a vehicle.
Figure 5:
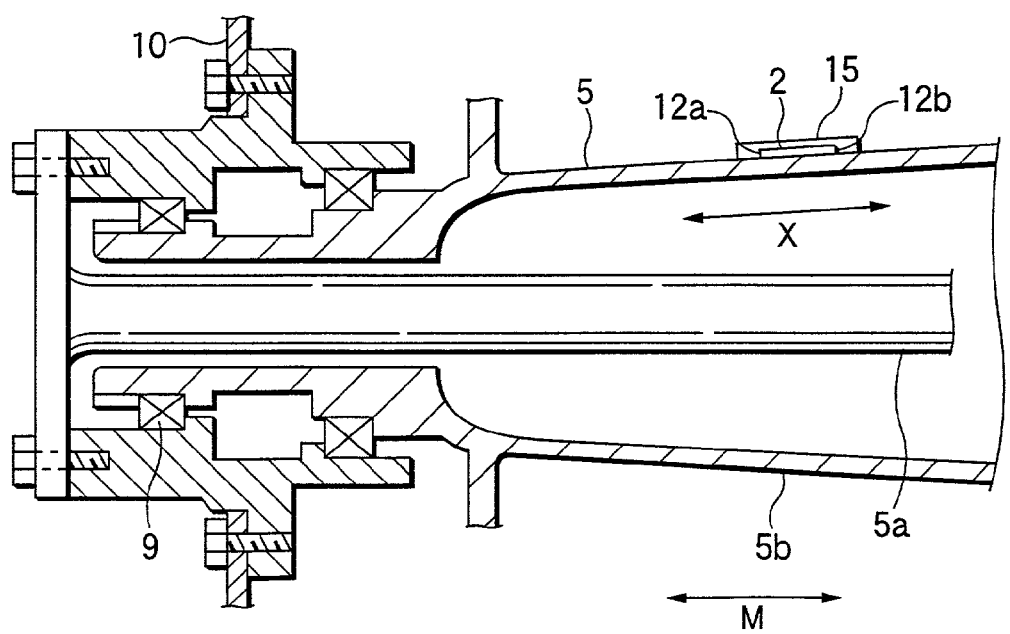
FIG. 5 is a longitudinal sectional view showing the sensing element mounted on the rear axle of a vehicle.

As shown in FIGS. 4 and 5, in the embodiment, the axle 5 includes a drive shaft 5a, a rear-axle tube 5b surrounding the drive shaft 5a, and a rear wheel drum 10 which is supported on the rear-axle tube 5b with the bearings 9 being interposed therebetween. A vehicle weight is entirely received by the rear-axle tube 5b, and the drive shaft 5a functions only to transfer a torque while being supported by the rear-axle tube 5b with the aid of the bearings 9. When the weight of the vehicle 6 and the loading weight act on the axle 5, the rear-axle tube 5b is bent upward. A compression force acts on the upper surface of the rear-axle tube 5b, while a tension force acts on the lower surface of the rear-axle tube 5b. In the embodiment, the plate members 2 are each mounted on the upper surface of the rear-axle tube 5b. Accordingly, the plate members 2 receive compression force in the longitudinal direction X. Each plate member 2 may be mounted on the lower surface of the rear-axle tube 5b. In this case, the plate member 2 receives a tension force in the longitudinal direction X. Further the plate member 2 may be mounted on a cover 11 of a differential gear, which is located at the central part of the rear-axle tube 5b. The front wheel axle 4 also includes a part which is bent by the vehicle weight. The plate member 2 is mounted on the upper surface or the lower surface of the bent part.

Each plate member 2 is welded and fastened to the front wheel axle 4 or 5 at both ends 2a and 2b in the longitudinal direction X, namely, two points. By the welding, two welding points 12a and 12b are formed on each plate member 2. The welding for fastening them is superior to another fastening means by adhesion, screws, pins or the like in that even if the fastened part is repeatedly placed under load, the reproducibility is little damaged and strain transmitting ability is high. In the embodiment, tungsten inert gas (TIG) welding is used for the welding. The fastening by two points is superior to the fastening by multiple points, i.e., three points or larger, in that it suppresses generation of a welding stress in a torsional direction in the sensing element 1, and hence a stable strain detection is secured. The plate member 2 is welded to the wheel axle 4 or 5, while keeping a gap δ between the plate member 2 and the wheel axle 4 or 5, as shown in FIG. 2.

To form the plate member 2, a steel plate is punched in a substantially rectangular shape. An insulating area (not shown) is formed on the surface of the plate member 2 by coating there with an insulating film made of silicon oxide or the like. Cutouts 13 are formed on both sides of the central part of the plate member 2 in the longitudinal direction X, and hence this part is narrowed in width. The plate member 2 is preferably formed with a stainless steel plate, and more preferably precipitation hardening type martensitic stainless steel (SUS630), whose composition comprises 17Cr-4Ni-4Cu-0.06C-0.25Nb (numeral: pts. wet.). When the stainless steel having such a composition is used, the temperature characteristic in low temperature region is improved.

The plate member 2 is configured such that buckling by the compression force mentioned above is not caused. Where the plate member 2 is bent or brought into buckling by the compression force, correct strain detection is impossible. Further, it is thinned to such an extent that buckling by the compression force is not caused, in order to secure easy punching or welding.

A minimum thickness "h" of the plate member 2 at which the buckling is not caused may be obtained by the Euler formula given below.

$$\sigma = n \cdot (\pi^2 \cdot E \cdot I)/(A \cdot L^2) \tag{1}$$

where σ: buckling stress (Mpa)

n: fixity coefficient (n=4 when both ends are fixed)

E: longitudinal elastic modulus (MPa) of a material of the plate member 2

I: momente of inertia of area (mm$^4$)

L: length (mm) of the plate member 2 in the Longitudinal direction

A: cross-sectional area (mm$^2$) of the plate member 2 in the widthwise direction Y Assuming that the buckling stress σ of the plate member 2 is set higher than the 2%-proof stress of SUS630 (883 MPa), namely σ≧883 (MPa), and the height (thickness) and width of a rectangular cross-sectional area of the plate member 2 are "h" and "b", and substituting I=bh$^3$/12 into the equation (1), then we have $$883 \leq n \cdot (\pi^2 \cdot E \cdot bh^3/12)/(bh \cdot L^2) \leq n \cdot \pi^2 \cdot E \cdot h^2/(12 \cdot L^2)$$

$$h \geq L \cdot ((883 \cdot 12)/(n \cdot \pi^2 \cdot E))^{1/2} \tag{2}$$

Assuming that n (fixity coefficient)=4, E (longitudinal elastic modulus of SUS630)=196200 (MPa), and L=20 (mm), and substituting those values into the equation (2), then we have $$h \geq 0.037 \cdot L$$

$$h \geq 0.74 \tag{3}$$

Thus, h≧0.74 (mm), and a thickness of the plate member 2 is 0.74 (mm). Accordingly, unless the thickness of the plate member 2 is equal to or smaller than 0.74 (mm), the buckling of the plate member 2 by the compression force is not caused, and expands and contracts in accordance with a load applied.

The load sensor 3 is formed on an insulating area consisting of silicon oxide film or the like at the central part of one of the surfaces of the plate member 2.

Figure 6A:
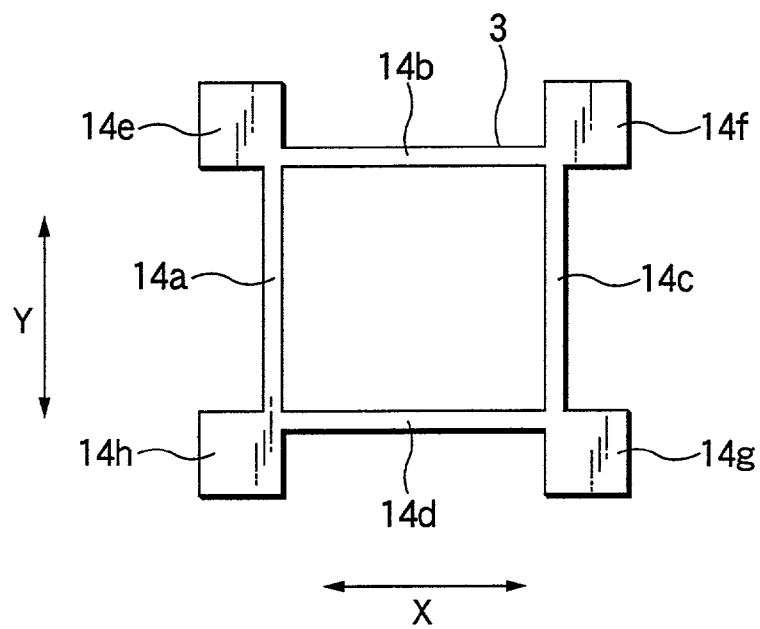
FIG. 6A is an enlarged plan view showing a load sensor for a vehicle.
Figure 6B:
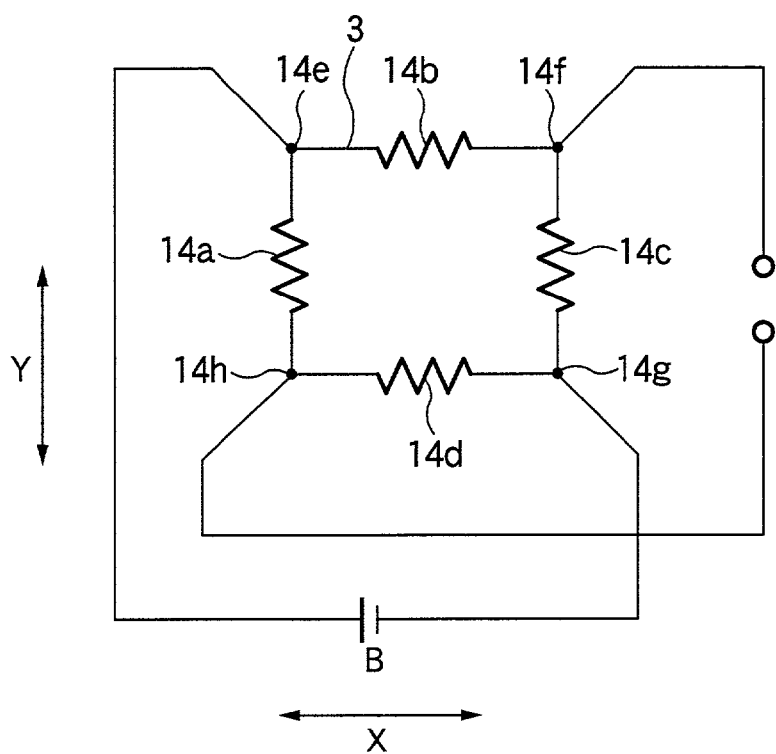
FIG. 6B is a diagram showing an equivalent circuit of it.

The load sensor 3, as shown in FIGS. 6A and 6B, contains a bridge connection of four resistors 14a, 14b, 14c and 14d, made of conductive material. On connection points of those resistors 14a to 14d, voltage is applied to between two connection points located on one of the diagonal lines. Then, a potential difference appears between two connection points on the other diagonal line, and varies in accordance with a compression force or a tension force acting on the plate member 2.

Those four resistors 14a to 14d are formed to be narrow at equal rates and widths, and the terminals of those are connected so as to form a square in shape. In this case, two resistors 14a and 14c of those resistors 14a to 14d are spaced from each other in the longitudinal direction X of the plate member 2. Other pair of resistors 14b and 14d are spaced from each other in the widthwise direction Y. The resistors 14a, 14b, 14c and 14d are pasted on the plate member 2 so as to be expanded or contracted in accordance with the applied load to the plate member 2. As a result, electrical resistances of the resistors 14a, 14b, 14c and 14d vary. Terminals 14e, 14f, 14g and 14h are provided at the four connection points of those four resistors 14a to 14d. Specifically, the terminals 14e, 14f, 14g and 14h are respectively provided between the resistors 14a and 14b, the resistors 14b and 14c, the resistors 14c and 14d, and the resistors 14d and 14a, so that those resistors 14a to 14d are electrically connected. Those terminals 14e to 14h are each square in shape. The sides of those squares are extended in parallel to the longitudinal direction X and the widthwise direction Y. When voltage V is applied from an operating power source B to between the terminal 14e located between the resistors 14a and 14b, and the terminal 14g located between the resistors 14c and 14d, a signal S appears between the terminal 14f for the resistors 14b and 14c, and the terminal 14h for the resistors 14b and 14c. The signal S varies in accordance with a load applied to the plate member 2 in the longitudinal direction X. Thus, those resistors form a semiconductor resistor bridge of which the output signal varies in accordance with a load that is applied to the plate member 2 in the longitudinal direction X.

The sensing elements 1 are fastened to the front wheel axles 4 and 5 while being covered with covers 15 (FIG. 5).

The operation of the sensing elements 1 mounted on the axles 4 and 5 on which the load measuring locations are placed, will be described.

Figure 7:
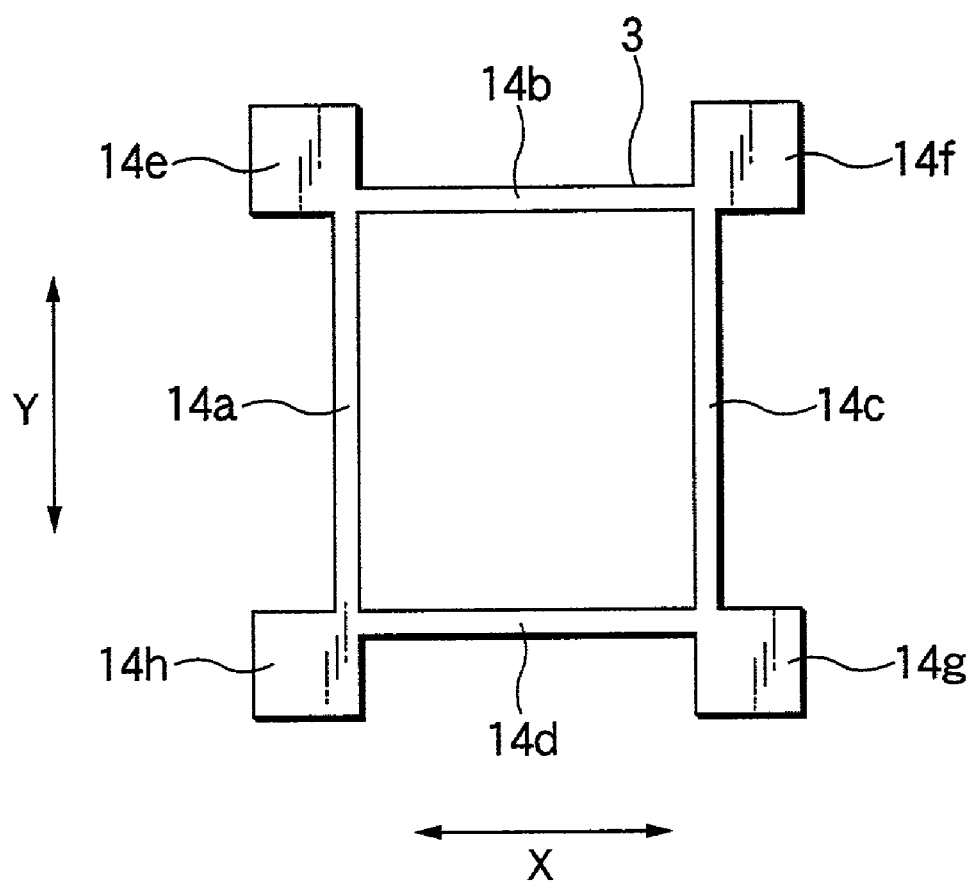
FIG. 7 is an enlarged plan view showing a load sensor deformed with flexure of the axle.

When the axles 4 and 5 are bent by a load acting on the vehicle 6, the plate member 2 of each sensing element 1 is compressed through two welding parts 12a and 12b. In the load sensor 3, as shown in FIG. 7, the dimensions of the paired resistors 14a and 14c of the plate member 2, which are opposed in the longitudinal direction X, remain unchanged. However, the pair of resistors 14b and 14d of the plate member 2, which are opposed in the widthwise direction Y, contract by equal lengths from the original dimensions. Accordingly, resistance values R14a and R14c of the resistors 14a and 14c remain unchanged, but the resistance values R14b and R14d of the resistors 14b and 14d are somewhat reduced from the original values. As a result, a potential $V4f=V\times\{R14b/(R14b+R14c)\}$ appearing at the terminal 14f drops from its original value, but a potential $V4ah=V\times\{R14a/(R14a+R14d)\}$ at the terminal 4h rise from its original value. A potential difference V4f−V4h between the terminals 4f and 4h changes from its original value. Accordingly, when the front wheel axles 4 and 5 are bent by the load acting on the vehicle 6, the output signal value of the load sensor 3 changes from its original value. A variation of the output signal value is proportional to a variation of the load.

Signals derived from the load sensors 3 are input to a control unit (not shown); the control unit in turn computes a weight of a load on a vehicle based on the signals from the sensors; and when the load weight exceeds a limited weight, an alarm around a driver's seat or the like is turned on.

In the embodiment mentioned above, the axle is used for the load measuring locations for fixing the sensing elements. If required, the sensing elements may be put on a wall surface of the piston of an injection molding machine or a reservoir tank, and loads acting on them may be measured.

As seen from the foregoing description, the invention provides a fixing structure for a sensing element, wherein a load sensor is located at the central part of a plate member as a support member of a sensing element in the longitudinal direction, plate member is attached to a load measuring location so that a length of the plate member when viewed in the longitudinal direction expands and contracts in accordance with a tension force or a compression force applied to the load measuring location, and both ends of the plate member when viewed in the longitudinal direction are welded to the load measuring location. In the fixing structure, the plate member is fastened by welding. Accordingly, the sensing element may easily be attached to the load measuring location. Accordingly, the fixing structure prevents the plate member from being loosened and slightly movable, and hence ensures an accurate measurement of the load. If the measurement is repeated, the measurement accuracy remains unchanged. The sensing element is welded at only two positions. When comparing with the fastening at three points or larger, generation of a welding stress in a torsional direction in the sensing element may be prevented, and hence a stable strain detection is secured. Since the welding is made at the locations spaced furthest from the load sensor, the load sensor is less affected by heat conduction.

In the fixing structure for a sensing element, the plate member is thin in the extent that the buckling of the plate member is by a compression force applied to the load measuring location is not caused. Therefore, appropriate welding to the load measuring location is secured. Since the plate member is thin to such an extent as to avoid the deflection by the buckling, an accurate load sensing is ensured.

In the fixing structure for a sensing element, the load sensor is arranged such that four resistors made of conductive material are bridge connected on an insulating area formed on the reverse side of the plate member, the resistors are connected at four connection points, and voltage is applied to the two connection points located on a diagonal line, and a potential difference appears between the two connection points located on the diagonal line and varies in accordance with a compression force or a tension force acting on the plate member, and the two resistors of the four resistors are oppositely disposed on the insulating area in the longitudinal direction of the plate member, while the remaining paired resistors are oppositely disposed on the insulating area in the widthwise direction. In the fixing structure thus arranged, a compression force or a tension force applied to the plate member through the welding parts acts to the resistors to vary resistance values of them. A load acting on the load measuring location may be correctly detected.

What is claimed is:

1. A fixing structure for a weight measuring element attached to an axle of a vehicle comprising:
   a plate member attached to an outermost surface of said axle; and a load sensor attached to said plate member at a central part of said plate member in a longitudinal direction of said plate member;

wherein said plate member is welded to said outermost surface of said axle at only two points so that said plate member expands and contracts in the longitudinal direction thereof in accordance with a tension force or a compression force applied to said axle; and wherein said outermost surface of said axle confronts an entire surface of said plate member.

2. A fixing structure for a weight measuring element according to claim 1, wherein said plate member has a thickness to prevent buckling of said plate member by a compression force applied to said axle.

3. A fixing structure for a weight measuring element according to claim 1, wherein said load sensor includes a bridge circuit constituted by four resistors disposed on an insulating area in said plate member, and said resistors are connected at four connection points, and a predetermined voltage is applied to one cater cornered pair of said four connection points, and a voltage between the other cater cornered pair of said four connection points, which shows a potential difference therebetween is measured, and two resistors of said four resistors are oppositely disposed on said insulating area in parallel to the longitudinal direction of said plate member, and the two remaining resistors are oppositely disposed on said insulating area in parallel to the widthwise direction of said plate member.

4. A fixing structure for a weight measuring element according to claim 1, wherein said plate member is welded to said axle so as to form a gap therebetween.

* * * * *